US005142871A

United States Patent [19]

Lampes et al.

[11] Patent Number: 5,142,871

[45] Date of Patent: Sep. 1, 1992

[54] COMBUSTOR DOME PLATE SUPPORT HAVING UNIFORM THICKNESS ARCUATE APEX WITH CIRCUMFERENTIALLY SPACED COOLANT APERTURES

[75] Inventors: Elias H. Lampes, Lynn; Clifford E. Allen, Jr., Newbury, both of Mass.

[73] Assignee: General Electric Company, Cincinnati, Ohio

[21] Appl. No.: 644,139

[22] Filed: Jan. 22, 1991

[51] Int. Cl.[5] .......... F23R 3/06; F02C 7/00

[52] U.S. Cl. .......... 60/756; 60/757

[58] Field of Search .......... 60/752, 755, 756, 757, 60/754; 431/158, 352

[56] References Cited

U.S. PATENT DOCUMENTS

| | | | |
|---|---|---|---|
| 3,385,055 | 5/1968 | Koblish et al. | 60/757 |
| 3,736,746 | 6/1973 | DuBell et al. | 60/39.36 |
| 3,750,397 | 8/1973 | Cohen et al. | 60/39.36 |
| 3,854,285 | 12/1974 | Stenger et al. | 60/756 |
| 3,906,718 | 9/1975 | Wood | 60/757 |
| 3,952,503 | 4/1976 | Fox et al. | 60/757 |
| 3,990,232 | 11/1976 | Campbell | 60/39.66 |
| 4,194,358 | 3/1980 | Stenger | 60/39.06 |
| 4,222,230 | 9/1980 | Bobo et al. | 60/39.36 |
| 4,912,922 | 4/1990 | Maclin | 60/757 |

FOREIGN PATENT DOCUMENTS

| | | | |
|---|---|---|---|
| 796501 | 6/1958 | United Kingdom | 60/756 |

*Primary Examiner*—Richard A. Bertsch
*Assistant Examiner*—Timothy S. Thorpe
*Attorney, Agent, or Firm*—Jerome C. Squillaro; Nathan D. Herkamp

[57] ABSTRACT

A combustor dome includes an annular dome plate having a plurality of circumferentially spaced apertures in a central portion thereof for receiving a plurality of carburetors. The dome plate also includes outer and inner support portions for joining the dome plate to combustion liners. Each of the support portions include a first leg extending from the central portion, a second leg, and an arcuate apex joining the first and second legs. The apex has a uniform thickness and includes a plurality of circumferentially spaced coolant apertures for channeling cooling air therethrough.

11 Claims, 3 Drawing Sheets

COMBUSTOR DOME PLATE SUPPORT HAVING UNIFORM THICKNESS ARCUATE APEX WITH CIRCUMFERENTIALLY SPACED COOLANT APERTURES

The U.S. Government has rights in this invention pursuant to Contract No. S8B001L awarded by the Department of the Navy.

TECHNICAL FIELD

The present invention relates generally to gas turbine engines, and, more specifically, to a combustor dome at an upstream end of an annular combustor.

BACKGROUND ART

A conventional gas turbine engine combustor includes a plurality of circumferentially spaced carburetors disposed in a dome at an upstream end of the combustor. The carburetors receive compressed air from a compressor disposed upstream therefrom and fuel for forming a fuel/air mixture which is ignited for forming combustion gases in the combustor which are then channeled to a conventional turbine disposed downstream therefrom. Maintaining stable combustion and achieving good performance of the combustor requires controlled introduction of the compressed air and good mixing in the combustor for obtaining preferred temperature profiles of the combustion gases discharged from the combustor. One of the most important influencing factors on the temperature distribution of the combustion gases discharged from the combustor is the uniformity and stability of the fuel and air in the combustor dome region, which is conventionally referred to as the primary zone.

Furthermore, a portion of the compressed air must also be effectively used for cooling the components of the combustor including the combustor dome and the combustion liners joined thereto. The compressed air used for cooling is typically channeled through machined cooling nuggets having circumferential slots for spreading the cooling air over the liners for obtaining acceptable film cooling thereof. The cooling nuggets are machined structures to ensure that small tolerances are maintained for providing effective cooling. Relatively small variations in the configurations of the cooling nuggets can significantly affect the cooling ability of the cooling nuggets. However, combustor domes having machined cooling nuggets are relatively complex and expensive to manufacture.

OBJECTS OF THE INVENTION

Accordingly, one object of the present invention is to provide a new and improved combustor dome for a gas turbine engine combustor.

Another object of the present invention is to provide a combustor dome having cooling air apertures therein, and simply fabricated without the need for complex machining.

DISCLOSURE OF INVENTION

A combustor dome includes an annular dome plate having a plurality of circumferentially spaced apertures in a central portion thereof for receiving a plurality of carburetors. The dome plate also includes outer and inner support portions for joining the dome plate to combustion liners. Each of the support portions includes a first leg extending from the central portion, a second leg, and an arcuate apex joining the first and second legs. The apex has a uniform thickness and includes a plurality of circumferentially spaced coolant apertures for channeling cooling air therethrough.

BRIEF DESCRIPTION OF DRAWINGS

The novel features believed characteristic of the invention are set forth and differentiated in the claims. The invention, in accordance with preferred and exemplary embodiments, together with further objects and advantages thereof, is more particularly described in the following detailed description taken in conjunction with the accompanying drawing in which:

MODE(S) FOR CARRYING OUT THE INVENTION

Figure 1:
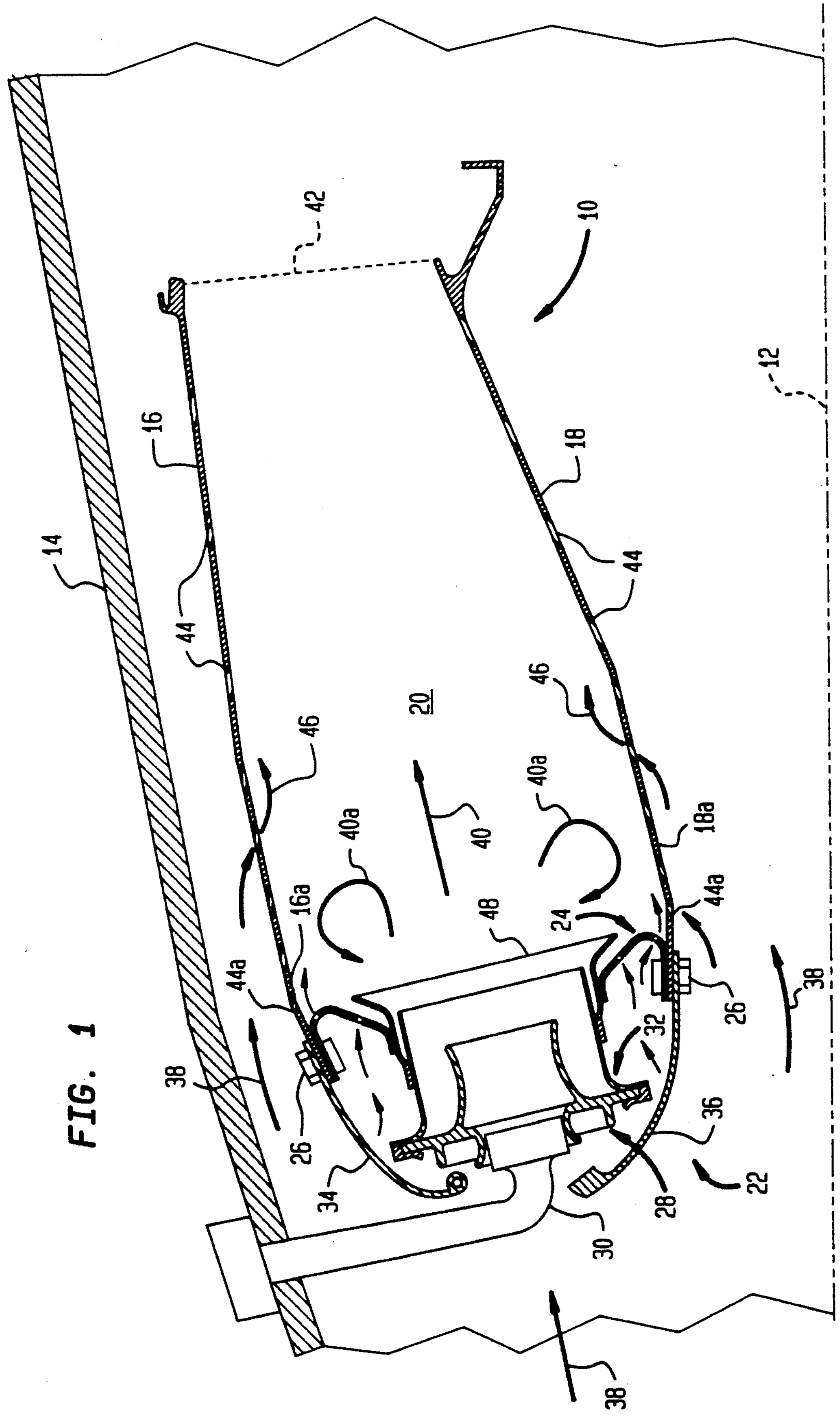
FIG. 1 is a longitudinal sectional view of a portion of an annular combustor including a combustor dome in accordance with one embodiment of the present invention.

Illustrated in FIG. 1 is a longitudinal sectional view of an annular combustor 10 disposed coaxially about an axial centerline axis 12 inside an annular casing 14 of a gas turbine engine. The combustor 10 includes an annular radially outer combustion liner 16, and an annular radially inner combustion liner 18 spaced therefrom to define an annular combustion chamber 20. The combustor 10 also includes a combustor dome, indicated generally at 22, shown in accordance with one embodiment of the present invention. The dome 22 includes an annular dome plate 24 disposed coaxially about the axial centerline axis 12 and fixedly joined to upstream ends 16*a*, 18*a* of the outer and inner liners 16, 18, respectively, by pluralities of circumferentially spaced bolts 26.

Conventionally joined to the dome plate 24 is a plurality of circumferentially spaced conventional carburetors 28, each including a conventional fuel injector 30 and air swirler 32. Also joined by the bolts 26 to the combustion liner upstream ends 16*a*, 18*a*, are conventional outer and inner sheet metal cowls 34 and 36 which (not shown) disposed upstream of the combustor 10. A portion of the compressed air 38 is mixed with fuel from the injector 30 and conventionally ignited for forming combustion gases 40 in the chamber 20. The combustion gases 40 are discharged from an outlet 42 at the downstream end of the combustor 10 and suitably channeled to a turbine (not shown) disposed downstream from the combustor 10.

In order to cool the liners 16 and 18, each of the liners includes a plurality of rows of circumferentially spaced inclined cooling holes 44, also referred to as multiholes 44, which receive a portion of the compressed air 38 channeled over the liners 16 and 18, which air 38 flows through the multiholes 44 in the liners 16 and 18 toward and into the chamber 20 for forming a film cooling boundary layer 46 along the inside surfaces of the liners 16, 18 for protecting the liners from the combustion gases 40. A first row 44*a* of the cooling holes 44 is preferably spaced relatively closely to the dome plate 24 for beginning the boundary layer 46 as soon as possible in the combustion chamber 20. Portions 40*a* of the combustion gases 40 recirculate immediately downstream of the carburetors 28 adjacent to the dome plate 24 and the liner upstream ends 16*a*, 18*a*. Accordingly, a conventional annular baffle, or splashplate, 48 conventionally supports the carburetor 28 to the dome plate 24 for protecting in part the dome plate 24 from the hot combustion gases 40*a*.

Figure 2:
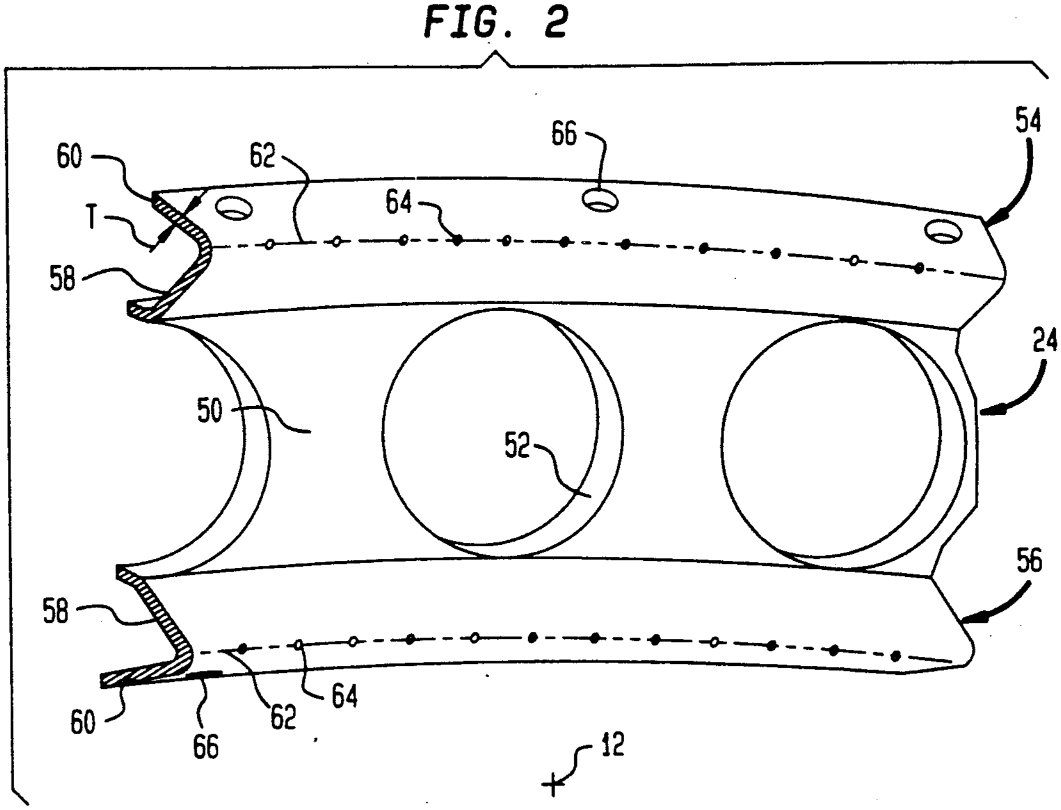
FIG. 2 is an upstream facing view of a portion of the annular dome plate of the combustor dome illustrated in FIG. 1.
Figure 3:
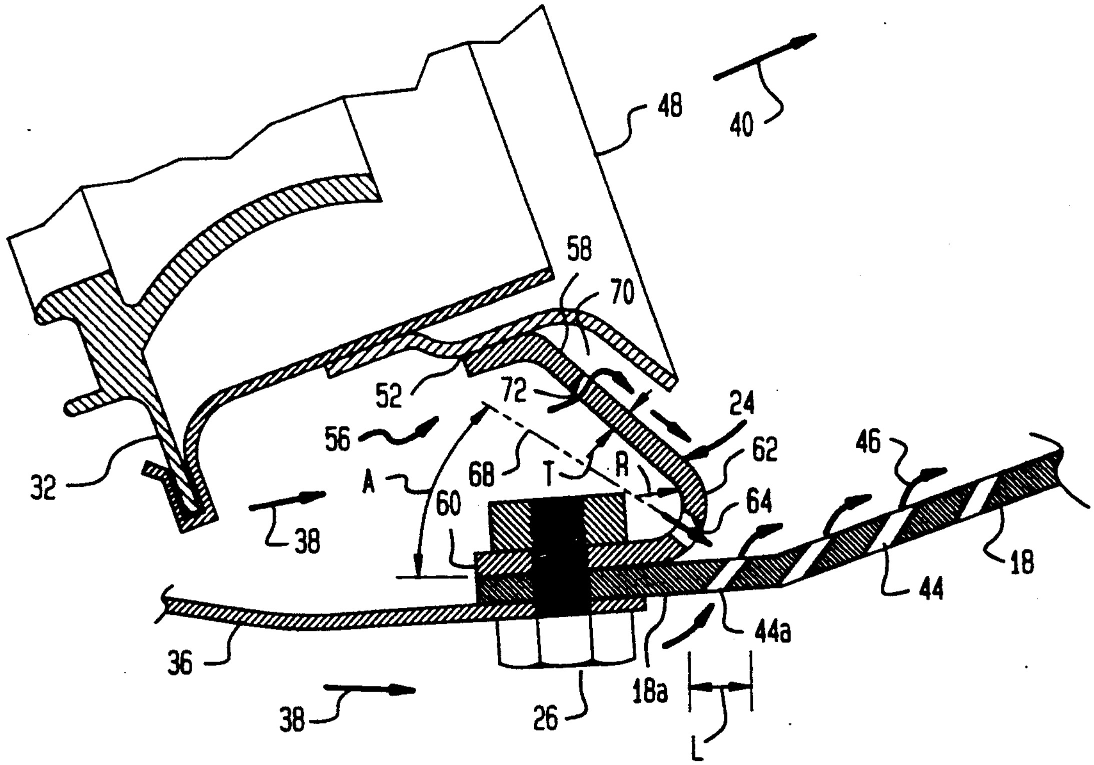
FIG. 3 is an enlarged longitudinal sectional view of a radially inner support portion of the combustor dome illustrated in FIG. 1.
Figure 4:
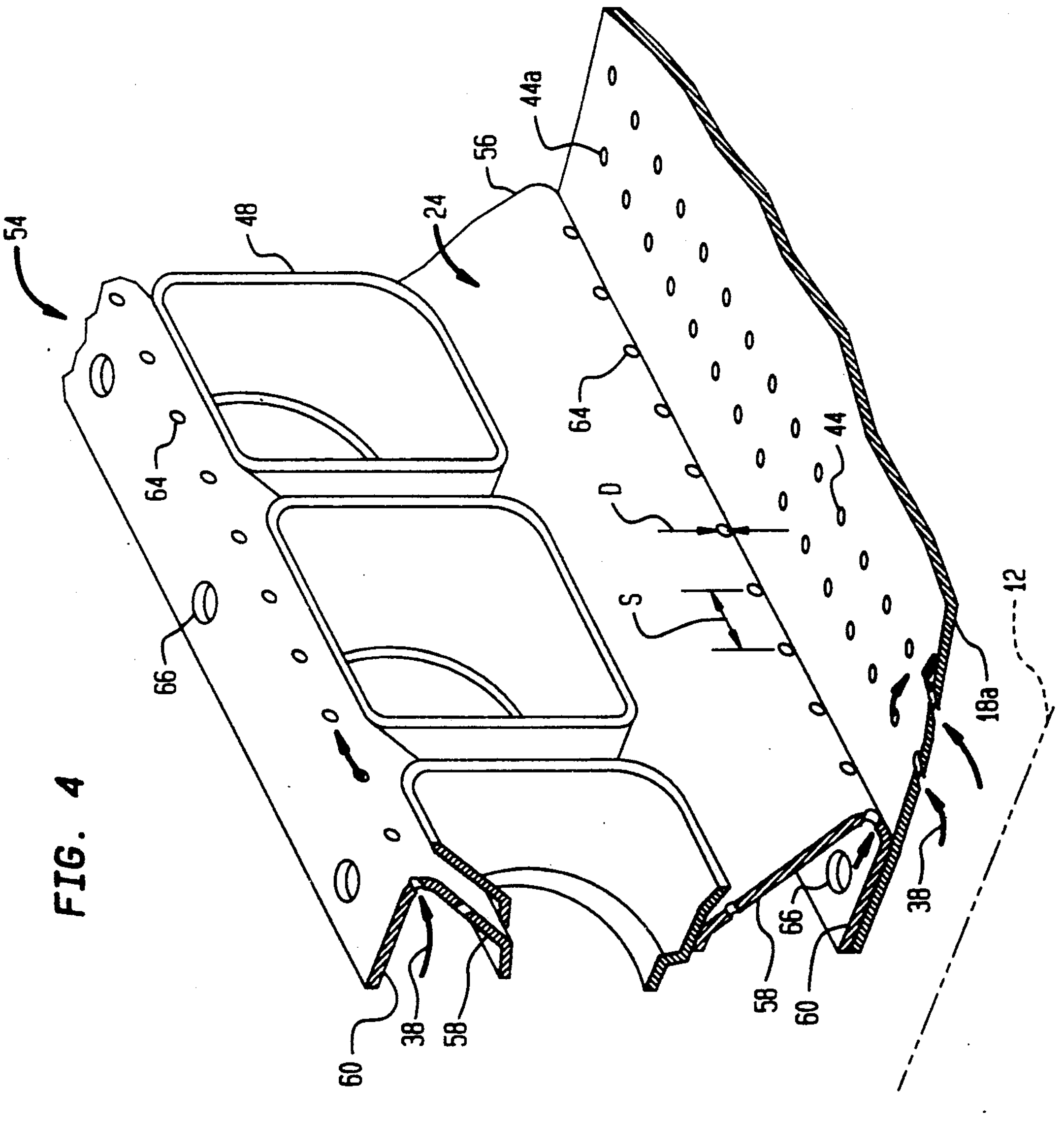
FIG. 4 is a perspective view of a portion of the combustion dome illustrated in FIG. 1.

Referring to FIGS. 2–4, the combustor dome 22 in accordance with a preferred embodiment of the present invention is shown in more detail. The dome plate 24 is preferably a unitary member having a substantially constant thickness T, which is preferably obtained by forming the dome plate 24 as a sheet metal member. In this way, the dome plate 24 may be fabricated using conventional sheet metal stamping and punching methods for forming a single member without the need for joining, by welding for example, several components to form the dome plate 24 as is conventionally done in the prior art. Furthermore, utilizing a sheet metal dome plate 24 also eliminates the relatively expensive machining operations, such as lathe turning, used on members not having a uniform thickness. As described hereinbelow, the various apertures in the dome plate 24 may be formed by conventional punching and electrical discharge machining (EDM).

As illustrated in FIG. 2, the dome plate 24 includes an annular central portion 50 disposed coaxially about the centerline axis 12 which includes a plurality of circumferentially spaced apertures 52 for receiving respective ones of the carburetors 28. The central portion apertures 52 may be formed by simply punching holes through the central portion 50 using conventional methods. The dome plate 24 further includes annular, radially outer and inner support portions 54 and 56, respectively, which extend integrally from the central portion 50 for joining the dome plate 24 to the combustion liners 16, 18. The preferred configuration of the outer and inner support portions 54, 56 as described hereinbelow may also be formed by conventional stamping or bending of the dome plate 24.

Each of the support portions 54, 56 includes a first leg 58 extending from the central portion 50, a second leg 60, and an arcuate apex 62 integrally joining the first leg 58 to the second leg 60. The apex 62 has the same uniform thickness T as the remainder of the dome plate 24 and includes a plurality of coolant apertures 64 which are circumferentially spaced and aligned at a common radius from the centerline axis 12 for channeling cooling air therethrough. The second legs 60 each include a plurality of circumferentially spaced holes 66 through which are positioned the bolts 26 for mounting the dome plate 24 to the liners 16, 18.

Since the outer and inner support portions 54 and 56 are substantially identical, the inner support portion 56 will be described in more detail, it being understood that the same description also applies to the outer support portion 54. FIG. 3 illustrates in more particularity the inner support portion 56 conventionally joined to the baffle 48, swirler 32, inner cowl 36, and inner combustion liner 18. In the preferred embodiment, the first and second legs 58, 60 are straight, and the second leg 60 is spaced from the first leg 58 for joining the dome plate 24 to the inner combustion liner 18 Each of the coolant apertures 64 has a central longitudinal axis 68 disposed at an acute angle A relative to the second leg 60 for channeling a portion of the compressed air 38 as a coolant through the aperture 64 in an outward direction relative to the central portion apertures 52 for impinging the coolant 38 on the inner surface of the combustion liner 18 at about the acute angle A. The longitudinal axis 68 of the aperture 64 is also disposed generally parallel to the first leg 58 so that the coolant 38 is channeled through the aperture 64 generally parallel the first leg 58.

The apex 62 may be conventionally formed by a stamping or bending operation of the dome plate 24 for creating a concave inner surface of radius R and a complementary convex outer surface which has a radius R plus the thickness T. The coolant apertures 64 may be formed in the apex 62 by conventional EDM, and, similarly, the holes 66 may also be formed by EDM.

The resulting configuration of the coolant aperture 64 in the apex 62 causes the coolant 38 to impinge against the combustion liner upstream end (16*a*, 18*a*) for both cooling that portion of the liner and, for initiating the boundary layer 46 from the inclined cooling holes i.e. at the first row of cooling holes 44*a*. In a preferred embodiment of the present invention, the first row 44*a* of the cooling holes 44 is predeterminedly spaced downstream from the coolant apertures 64 at a distance L so that the coolant apertures 64 form a coolant boundary layer to initiate the film cooling from the inclined cooling holes first row 44*a*.

As illustrated in more particularity in FIG. 4, the coolant apertures 64 are predeterminedly circumferentially spaced apart a distance S for providing a substantially uniform boundary layer of the coolant 38 between the apertures 64 and the first row 44*a* of the cooling holes 44 for providing film cooling of the combustion liners (16, 18). Each of the apertures 64 has a diameter D, and in one exemplary embodiment of the present invention the coolant apertures 64 are circumferentially spaced apart at a distance S which is about twice the diameter D. In this way, the coolant apertures 64 cooperate with each other in the arcuate apex 62 and with the liner upstream ends (16*a*, 18*a*) between the apertures 64 and the first row 44*a* of cooling holes 44 for providing an effective, substantially uniform boundary layer of coolant 38.

Component tests conducted on this preferred embodiment of the invention indicate the formation of effective film cooling without the need for conventional cooling nugget structure having film cooling slots. More specifically, both the outer and inner support portions 54 and 56 are characterized by the absence of structure such as a cooling nugget lip for forming an annular plenum for receiving the coolant 38 from the coolant apertures 64 to form a boundary layer. In the prior art, a film cooling boundary layer is typically formed by cooling holes feeding an annular U-shaped plenum having an annular outlet slot to form a substantially uniform film cooling boundary layer therefrom. However, in accordance with the preferred embodiment of the present invention as described above, the coolant apertures 64 disposed simply in the arcuate apex 62 are effective for cooling the combustor liner upstream ends (16*a*, 18*a*) without the need for a conventional cooling nugget structure.

As shown in FIG. 3, the baffles 48 are conventional and are conventionally joined to the central portion apertures 52 and spaced at least in part from the first legs 58 for forming a channel 70 therebetween. Conventional impingement-type cooling holes 72 are conventionally formed through the first leg 58 to impinge the coolant 38 against the back side of the baffle 48 and then flow generally parallel along the surface of the first leg 58 in the channel 70. The coolant from the channel 70 then flows over the apex 62 and is disposed between the coolant 38 from the apertures 64 and the combustion gases 40. It is believed that this cooperation of the coolant 38 from the channel 70 assists in providing film cooling by the coolant 38 from the apertures 64 against the liner upstream ends 16*a*, 18*a*.

Since the dome plate 24 may be formed from a unitary sheet metal member and conventionally formed using stamping, bending, punching, and EDM operations, the dome plate 24 may be more easily manufactured at reduced cost as compared to multi-piece dome plates of varying thickness which require more expensive machining operations including the use of lathes, for example. Furthermore, since the dome plate 24 may be simply bolted to the outer and inner liners 16 and 18, the fabrication method for the entire combustor dome 22 is simplified, which also reduces cost, and allows for relatively easy disassembly and repair and replacement of component parts thereof.

Figure 5:
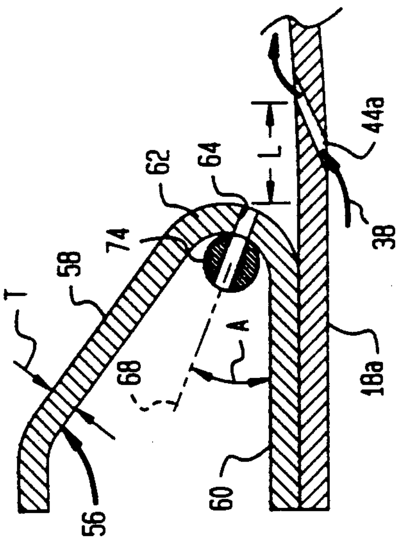
FIG. 5 is a longitudinal sectional view of the inner support portion of the combustor dome illustrated in FIG. 1 in accordance with an alternate embodiment of the present invention.

Illustrated in FIG. 5 is an alternate embodiment of the present invention wherein each of the outer and inner support portions 54, 56 (inner support portion 56 being shown) may additionally include an annular ring 74 suitably conventionally fixedly connected to the concave side of the apex 62, for example by brazing. The coolant aperture 64 may then be formed through both the apex 62 and through the ring 74 coaxially about the longitudinal axis 68. In this way, a relatively long coolant aperture 64, i.e. longer than the thickness T of the dome plate 24, may be provided for more accurately directing the coolant 38 to impinge against the liners 16, 18. The coolant apertures 64 may, therefore, have a relatively high length-to-diameter ratio as is typically found in a conventional, machined cooling nugget for more accurately directing the coolant 38 for ensuring the formation of a substantially uniform film cooling boundary layer.

In the preferred embodiment of the invention disclosed above, the outer and inner support portions 54 and 6 including the coolant apertures 64 have been shown by tests to be effective for suitably cooling the combustor liners 16, 18 disposed adjacent to the apertures 64, and for initiating the film cooling boundary layer from the first row 44*a* of the inclined holes 44. In one embodiment of the invention, the spacing L between the coolant apertures 64 and the first row 44*a* of inclined holes is about 0.5 inches (12.7 mm). The acute angles A for the outer and inner support portions 54, 56 are 54° and 44°, respectively. The inclined holes 44 are inclined at about an angle of 20° relative to the liners 16, 18 and have a pitch-to-diameter ratio of about 6.

In alternate embodiments of the present invention, the outer and inner support portions 54 and 56 may be utilized with conventional film cooling nuggets formed in the liners 16, 18 instead of using the inclined apertures, or multiholes, 44. However, it is preferred that the first row of film cooling nuggets is spaced as close as practical to the coolant apertures 64 for ensuring effective cooling of the liners at that location.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. A combustor dome comprising an annular dome plate disposed coaxially about an axial centerline axis, said dome plate including:

- an annular central portion having a plurality of circumferentially spaced apertures for receiving a respective plurality of carburetors;
- radially outer and inner support portions extending from said central portion for joining said dome plate to combustion liners;
- each of said outer and inner support portions including a first leg extending from said central portion, a second leg, and an arcuate apex joining said first leg to said second leg, said apex having in longitudinal section along said axial centerline axis a concave inner surface and a convex outer surface and a uniform thickness therebetween from said first leg to said second leg, and a plurality of circumferentially spaced coolant apertures for channeling cooling air therethrough.

2. A combustor dome according to claim 1 wherein said second leg is straight and spaced from said first leg for joining said dome plate to one of said combustion liners, and each of said coolant apertures has a longitudinal axis disposed at an acute angle relative to said second leg for channeling said coolant therethrough in an outward direction for impinging said coolant on said one combustion liner at said acute angle.

3. A combustor dome according to claim 2 wherein said coolant apertures are predeterminedly circumferentially spaced apart for providing a substantially uniform boundary layer of said coolant for film cooling said combustion liners.

4. A combustor dome according to claim 3 wherein each of said coolant apertures has a diameter, and said coolant apertures are circumferentially spaced apart a distance about twice said diameter.

5. A combustor dome according to claim 3 wherein said outer and inner support portions are characterized by the absence of structure for forming an annular plenum for receiving said coolant from said coolant apertures to form said boundary layer.

6. A combustor dome according to claim 3 wherein said dome plate is a unitary member having a substantially constant thickness.

7. A combustor dome according to claim 6 wherein said dome plate is a sheet metal member.

8. A combustor dome according to claim 3 further including a plurality of baffles joined to said central portion apertures and spaced at least in part from said first legs of said outer and inner supports to form a channel therebetween; and said first legs including impingement holes for channeling therethrough a portion of said coolant to impinge against said baffles and then flow along said first legs in said channel and over said apex.

9. A combustor dome according to claim 3 further including a ring fixedly joined to said concave inner surface of said apex, and said coolant aperture extends through both said ring and said apex.

10. A combustor dome according to claim 3 further including:

a radially outer combustion liner upstream end joined to said second leg of said outer support;

a radially inner combustion liner upstream end joined to said second leg of said inner support;

each of said liner upstream ends including a plurality of rows of circumferentially spaced inclined cooling holes and a first row of said inclined cooling holes is predeterminedly spaced downstream from said coolant apertures so that said coolant boundary layer from said coolant apertures initiates film cooling from said inclined cooling holes.

11. A combustor dome according to claim 10 further including a plurality of bolts fixedly joining said dome plate to said outer and inner combustion liner upstream ends.

* * * * *